Nov. 6, 1923.
N. S. NELSON
TRAP
Filed Oct. 29, 1921
1,473,505
2 Sheets-Sheet 1
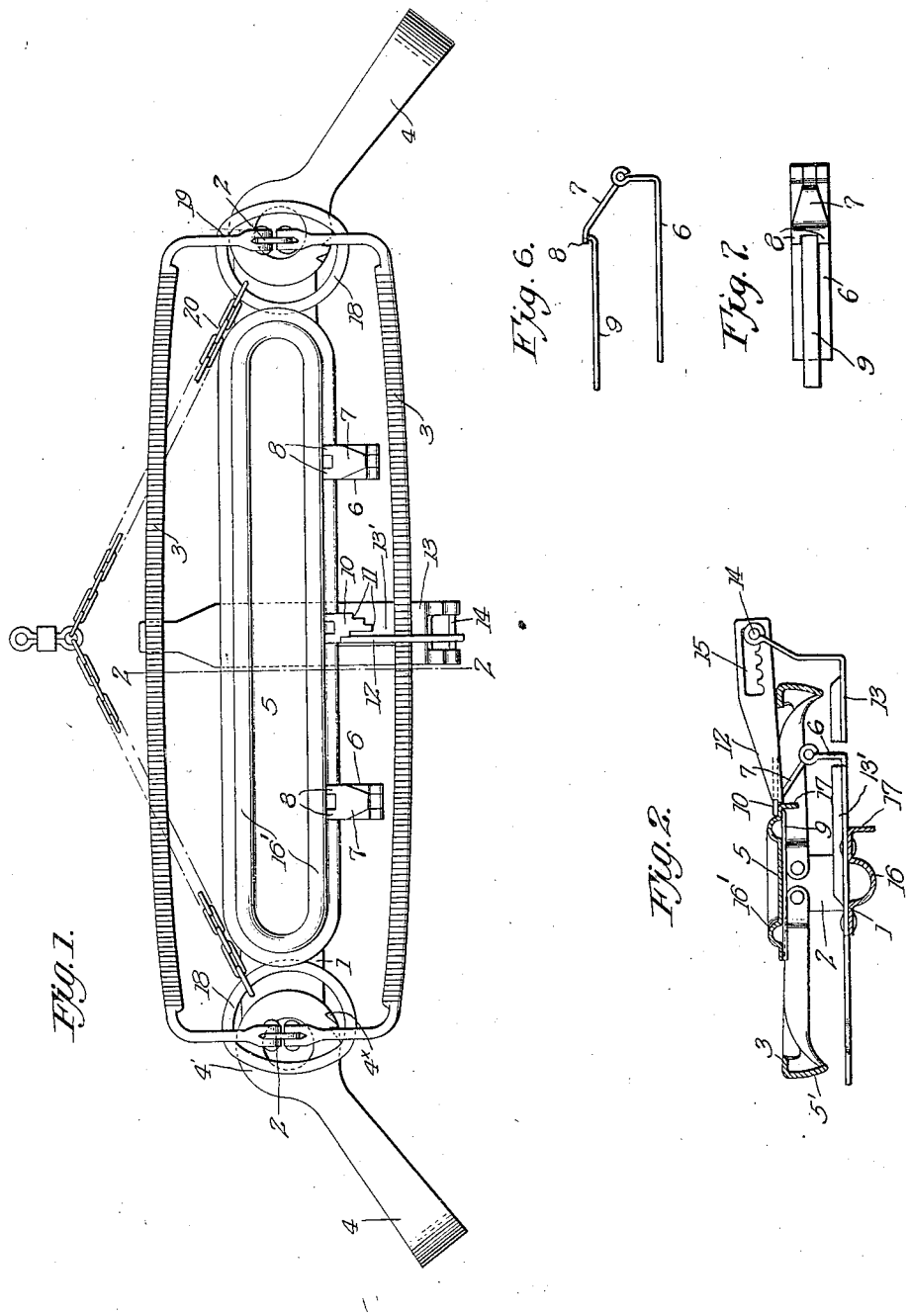
N. S. Nelson
INVENTOR
BY Victor J. Evans
ATTORNEY
WITNESS:

Nov. 6, 1923.
N. S. NELSON
TRAP
Filed Oct. 29, 1921
1,473,505
2 Sheets-Sheet 2
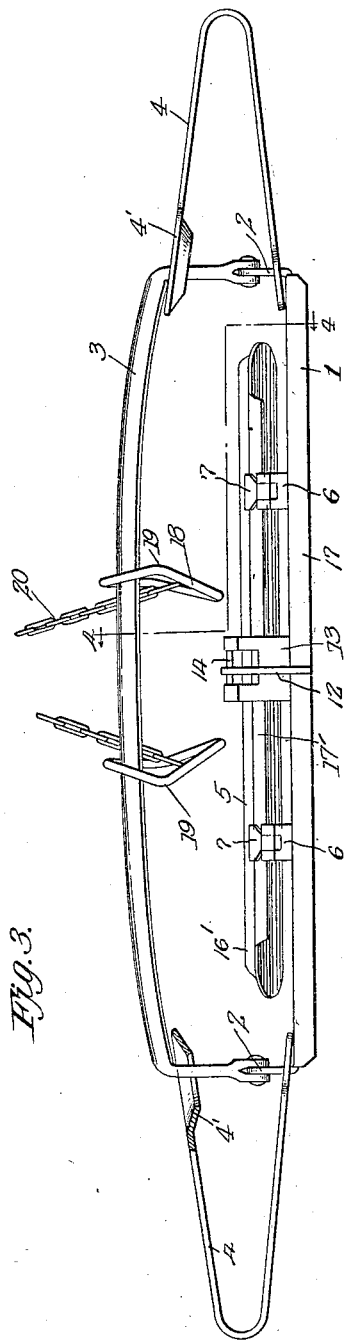
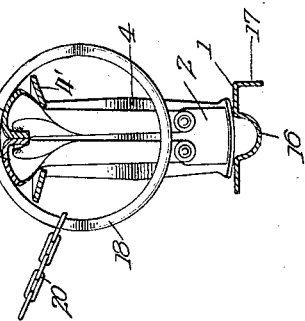
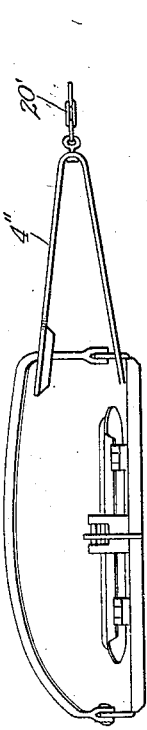
N. S. Nelson
INVENTOR
BY Victor J. Evans
ATTORNEY
WITNESS:

Patented Nov. 6, 1923.

1,473,505

UNITED STATES PATENT OFFICE.

NELS S. NELSON, OF HARVEY, NORTH DAKOTA.

TRAP.

Application filed October 29, 1921. Serial No. 511,321.

*To all whom it may concern:*

Be it known that I, NELS S. NELSON, a subject of the King of Great Britain, residing at Harvey, in the county of Wells and State of North Dakota, have invented new and useful Improvements in Traps, of which the following is a specification.

This invention relates to animal traps, and is an improvement over the traps disclosed in my prior Patents Nos. 1,337,149, dated Apr. 13, 1920 and 1,391,570, dated Sept. 20, 1921. The object of the present invention is to cheapen the cost of manufacture and reduce the weight of the article by making it of stamped metal, the parts being strengthened by beads, flanges and arches.

Another object of the invention is to provide means for preventing the animal from drawing his captured leg lengthwise of the trap which is apt to sever the leg and thus release the animal.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of a trap constructed in accordance with my invention and with the jaws in set position.

Figure 2 is a section on line 2—2 of Figure 1.

Figure 3 is an elevation, partly in section, with the jaws in closed position.

Figure 4 is a section on line 4—4 of Figure 3.

Figure 5 is a view of a trap provided with a single spring.

Figure 6 is a detail side view showing the pivotal connection of the trip pan with the base.

Figure 7 is a plan view of the structure shown in Figure 6.

In these views 1 indicates the base which is provided with the turned up end parts 2 to which the jaws 3 are pivoted in the usual manner, these jaws being held in closed position by the springs 4. The trip pan 5 is hinged to the upturned ends of the cross pieces 6 which are riveted to the base, the hinged parts 7 on the pan each having short tongues 8, engaging the upper face of the pan, and a long central tongue 9 which passes through an opening in the pan and engages the under face of the pan. This long tongue is preferably welded to the pan. Thus the hinged parts are securely connected with the pan. The dog engaging member 10 is connected with the pan in the same manner, this member being provided with a plurality of shoulders 11 for receiving the shouldered end of the dog 12 which is adjustably connected with the central cross piece 13, secured to the base, by means of the shaft 14 and the slot 15, provided with the notched lower wall. The upper end of each of the springs 4 is provided with the dished enlargement 4' for increasing the effectiveness of the springs upon the jaws.

The arrangement and construction of parts above described are substantially the same as shown in the before mentioned patents though instead of forming the trap of the usual heavy iron parts I form it of pressed metal, the base and pan being formed with the beads 16 and 16' and flanges 17, and 17', the cross trip 13 with the bead 13' and the jaws 5 being flanged and arched, as shown at 5'. Thus the trap is of light weight but of great strength and can be manufactured at small expense. The flanges on the depending parts of the jaws are pressed together to make these parts of the jaws of small cross sectional shape so that the springs can properly engage them. The abutting parts of the jaws are formed by the depending flanges, the abutting faces of which are corrugated or roughened to prevent the animal from pulling his foot from between the jaws.

The parts 4' of the springs are notched, as at 4$^x$, these notches being adapted to receive parts of the jaws when the same are in set position to enable the jaws to rest in a substantially horizontal position.

I also provide means for preventing the animal from sliding his foot or leg between the jaws in an effort to loosen himself from the trap, this sliding movement tending to sever the leg or foot, and thus release the animal. Such means consists of a pair of ring members 18 which are bent, at 19, to distort them and which are connected with the forked end of the chain 20 which is used to fasten the trap to a stake or other object. The ring members will rest upon the parts 4' of the springs when the trap is set, as shown in Figure 1, but as soon as the trap is sprung the rings will ride up over the jaws until they press upon the captured leg. Thus any attempt of the animal to pull his leg one way or the other, longitudinally of the trap, will be frustrated by the pressure of the ring members against the leg so that the leg will remain in one position.

Figure 5 shows a modification in which only one spring 4" is used and the chain 20' is fastened to the end of this spring. In other respects this form of trap is similar to that above described.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A trap of the class described comprising a base part having a flange at one side thereof and a longitudinally extending bead at the center thereof, the ends of the base being bent upwardly, jaw members pivoted to said upwardly extending ends, said jaw members being of substantially angle shape in cross section with the horizontal flanges of arched shape, a spring engaging said jaw members, a trip pan movably connected with the base, said pan having a flange at one side and a bead extending around the pan adjacent the edges thereof.

2. A trap of the class described comprising a base part having a flange at one side thereof and a longitudinally extending bead at the center thereof, the ends of the base being bent upwardly, jaw members pivoted to said upwardly extending ends, said jaw members being of substantially angle shape in cross section with the horizontal flanges of arched shape, a spring engaging said jaw members, a trip pan movably connected with the base, said pan having a flange at one side, a bead extending around the pan adjacent the edges thereof, said spring having a cup-shaped part through which the jaw members pass and notches on the outer edge of the cup-shaped part for receiving the jaw members when the same are in open position.

3. A holding member for a trap comprising a pair of rings slidably engaging the jaws of the trap, a fastener and a flexible member connecting each ring with said fastener.

In testimony whereof I affix my signature.

NELS S. NELSON.